US008761487B2

(12) United States Patent
O'Neill

(10) Patent No.: US 8,761,487 B2
(45) Date of Patent: Jun. 24, 2014

(54) METHODS OF OPERATING AN IMAGE-BASED CHECK PROCESSING SYSTEM TO DETECT A DOUBLE FEED CONDITION OF CHECKS AND AN APPARATUS THEREFOR

(75) Inventor: Darryl S. O'Neill, Ontario (CA)

(73) Assignee: NCR Corporation, Duluth, GA (US)

( * ) Notice: Subject to any disclaimer, the term of this patent is extended or adjusted under 35 U.S.C. 154(b) by 145 days.

(21) Appl. No.: 13/327,310

(22) Filed: Dec. 15, 2011

(65) Prior Publication Data

US 2013/0156291 A1 Jun. 20, 2013

(51) Int. Cl.
*G06K 9/00* (2006.01)
*G07F 19/00* (2006.01)

(52) U.S. Cl.
CPC *G07F 19/20* (2013.01); *G06K 9/00* (2013.01); *B65H 2511/524* (2013.01)
USPC .......................................... 382/140; 382/139

(58) Field of Classification Search
None
See application file for complete search history.

(56) References Cited

U.S. PATENT DOCUMENTS

| | | | | |
|---|---|---|---|---|
| 3,629,822 A * | 12/1971 | Johnson | | 382/320 |
| 3,938,089 A * | 2/1976 | McGregor et al. | | 382/318 |
| 4,243,983 A * | 1/1981 | Vyas | | 340/674 |
| 4,510,615 A * | 4/1985 | Rohrer | | 382/139 |
| 5,673,333 A * | 9/1997 | Johnston | | 382/137 |
| 5,861,646 A * | 1/1999 | Czesnik et al. | | 250/559.4 |
| 6,123,260 A * | 9/2000 | Menzenski | | 235/449 |
| 6,364,556 B1 * | 4/2002 | Barbera et al. | | 400/708 |
| 6,384,844 B1 * | 5/2002 | Stewart et al. | | 715/764 |
| 6,473,519 B1 * | 10/2002 | Pidhirny et al. | | 382/140 |
| 6,473,674 B1 * | 10/2002 | Okada | | 700/227 |
| 6,504,946 B1 * | 1/2003 | Rossignoli | | 382/139 |
| 6,647,136 B2 * | 11/2003 | Jones et al. | | 382/137 |
| 6,654,487 B1 * | 11/2003 | Downs, Jr. | | 382/139 |
| 6,902,105 B2 * | 6/2005 | Koakutsu | | 235/379 |
| 6,956,962 B1 * | 10/2005 | Hayosh | | 382/139 |
| 7,606,408 B2 * | 10/2009 | Takiguchi | | 382/139 |
| 7,637,422 B2 * | 12/2009 | Kwak et al. | | 235/379 |
| 7,644,043 B2 * | 1/2010 | Minowa | | 705/45 |
| 7,689,025 B2 * | 3/2010 | Takiguchi | | 382/139 |
| 7,845,637 B2 * | 12/2010 | Shimazaki | | 271/262 |
| 7,978,900 B2 * | 7/2011 | Nepomniachtchi et al. | .. | 382/137 |
| 8,091,784 B1 * | 1/2012 | Ma et al. | | 235/449 |
| 8,162,125 B1 * | 4/2012 | Csulits et al. | | 194/206 |
| 8,218,851 B1 * | 7/2012 | Cantley et al. | | 382/137 |
| 8,231,057 B1 * | 7/2012 | Buentello et al. | | 235/462.11 |
| 2002/0051562 A1 * | 5/2002 | Sheppard et al. | | 382/137 |
| 2002/0141660 A1 * | 10/2002 | Bellavita et al. | | 382/309 |
| 2004/0062431 A1 * | 4/2004 | O'Neill | | 382/137 |
| 2005/0018896 A1 * | 1/2005 | Heit et al. | | 382/137 |

(Continued)

*Primary Examiner* — Vu Le
*Assistant Examiner* — Alexander J Lesnick
(74) *Attorney, Agent, or Firm* — Michael Chan

(57) ABSTRACT

A method is provided of operating an image-based check processing system to detect a double feed condition of checks. The method comprises attempting to read a magnetic ink character recognition (MICR) codeline from front of a check item. The method also comprises electronically by a rear imaging camera, capturing image data which is representative of a rear image of the check item as the check item is transported from an upstream end of the document feed path to a downstream end of the document feed path. The method further comprises alerting an operator when information from the attempted read of a MICR codeline from front of the check item and information from the rear image of the check item meet predetermined criteria which is indicative the check item comprising two overlapping checks.

12 Claims, 4 Drawing Sheets

(56) References Cited

U.S. PATENT DOCUMENTS

| | | | |
|---|---|---|---|
| 2005/0189272 A1* | 9/2005 | DiBiaso et al. | 209/584 |
| 2007/0164097 A1* | 7/2007 | Kwak et al. | 235/379 |
| 2009/0214085 A1* | 8/2009 | Bickell et al. | 382/112 |
| 2010/0170945 A1* | 7/2010 | Cantley et al. | 235/379 |
| 2011/0243394 A1* | 10/2011 | Matsuo et al. | 382/115 |
| 2012/0170829 A1* | 7/2012 | Jackson et al. | 382/140 |

* cited by examiner

METHODS OF OPERATING AN IMAGE-BASED CHECK PROCESSING SYSTEM TO DETECT A DOUBLE FEED CONDITION OF CHECKS AND AN APPARATUS THEREFOR

TECHNICAL FIELD

This present invention relates to processing document items in an image-based check processing system, and is particularly directed to methods of operating an image-based check processing system to detect a double feed condition of checks and an apparatus therefor.

BACKGROUND

A typical image-based check processing system includes a check processing transport which has a document track and a number of check processing modules positioned along the document track for performing specific document processing operations on document items including checks moving downstream along the document track. The check processing system also includes a transport processor which executes a transport application program which is stored in memory to control operation of devices contained within the check processing modules positioned along the document track and thereby to control operation of the check processing transport.

A typical check processing transport includes a hopper into which a stack of document items is placed. An operator initially prepares the document items (e.g., orienting document items properly (forwards and upside right), removing staples, removing paper clips, straightening bent corners, and the like) before they are placed into the hopper. A document feeder adjacent the hopper selectively feeds or drives each document item from the stack of document items in the hopper to transport the document item from the upstream end to the downstream end along the document track past a magnetic ink character recognition (MICR) reader and an image capture device. The MICR reader reads a codeline from each document item. The image capture device captures an image of the front of the document item and an image of the back of the document item. The document items are eventually transported to sorting pockets of a pocket device located at the downstream end of the document track. The pockets receive document items which have been sorted based upon the particular transport application program.

From time to time, a double feed condition occurs (e.g., two overlapping checks) when only one check should have been fed along the document track. The occurrence of a double feed condition causes an undesirable result. A double feed condition of checks would result in one of the checks being missed and not processed. Eventually at some later time during balancing, it takes up much time from a human operator to locate the unprocessed check and then to reprocess it to complete the balancing function. This is time-consuming and costly.

Different ways of detecting a double feed condition of checks in an image-based check processing system are known. One known way to detect a double feed condition of checks is to use double feed detect sensors. A drawback in using double feed detect sensors is the number of false detections (i.e., a sensor indicating that a double feed condition has occurred, but when in fact a double feed condition has not occurred). A false detection of a double feed condition takes up some time from a human operator, but not as much time as would be taken up to locate and process a missing check caused by a true detection of a double feed condition.

Another known way to detect a double feed condition of checks in a check processing system is to determine if a captured image of a check has a proper MICR codeline. As an example, if the length of a MICR codeline from a check image is determined to be longer than the longest possible MICR codeline, then this would indicate an overlap of two checks. As another example, if the number of codeline field groupings from a check image exceeds the maximum possible number of codeline field groupings, then this would indicate an overlap of two checks.

Still another known way to detect a double feed condition of checks in a check processing system is to determine if a captured image of a business type of check has a proper image length. If the length of the check image is determined to be longer than the longest possible check length for a business check, then this would indicate an overlap of two checks. It would be desirable to provide methods of detecting a double feed condition of checks in a check processing system so that double feed detection is improved without having to take up more human operator time.

SUMMARY

In accordance with one embodiment, a method is provided of operating an image-based check processing system to detect a double feed condition of checks. The method comprises attempting to read a magnetic ink character recognition (MICR) codeline from front of a check item. The method also comprises electronically by a rear imaging camera, capturing image data which is representative of a rear image of the check item as the check item is transported from an upstream end of the document feed path to a downstream end of the document feed path. The method further comprises alerting an operator when information from the attempted read of a MICR codeline from front of the check item and information from the rear image of the check item meet predetermined criteria which is indicative the check item comprising two overlapping checks.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

The present invention is directed to methods of operating an image-based check processing system to detect a double feed condition of checks. The specific construction and use of the image-based check processing system may vary. The check processing system may be, for example, a sorting machine or a proof machine wherein financial document items are processed in a bank. The financial document items may be in any number of forms. As examples, a financial document item may be in the form of a check, a deposit slip, a cash-in slip, or a cash-out slip.

Figure 1:
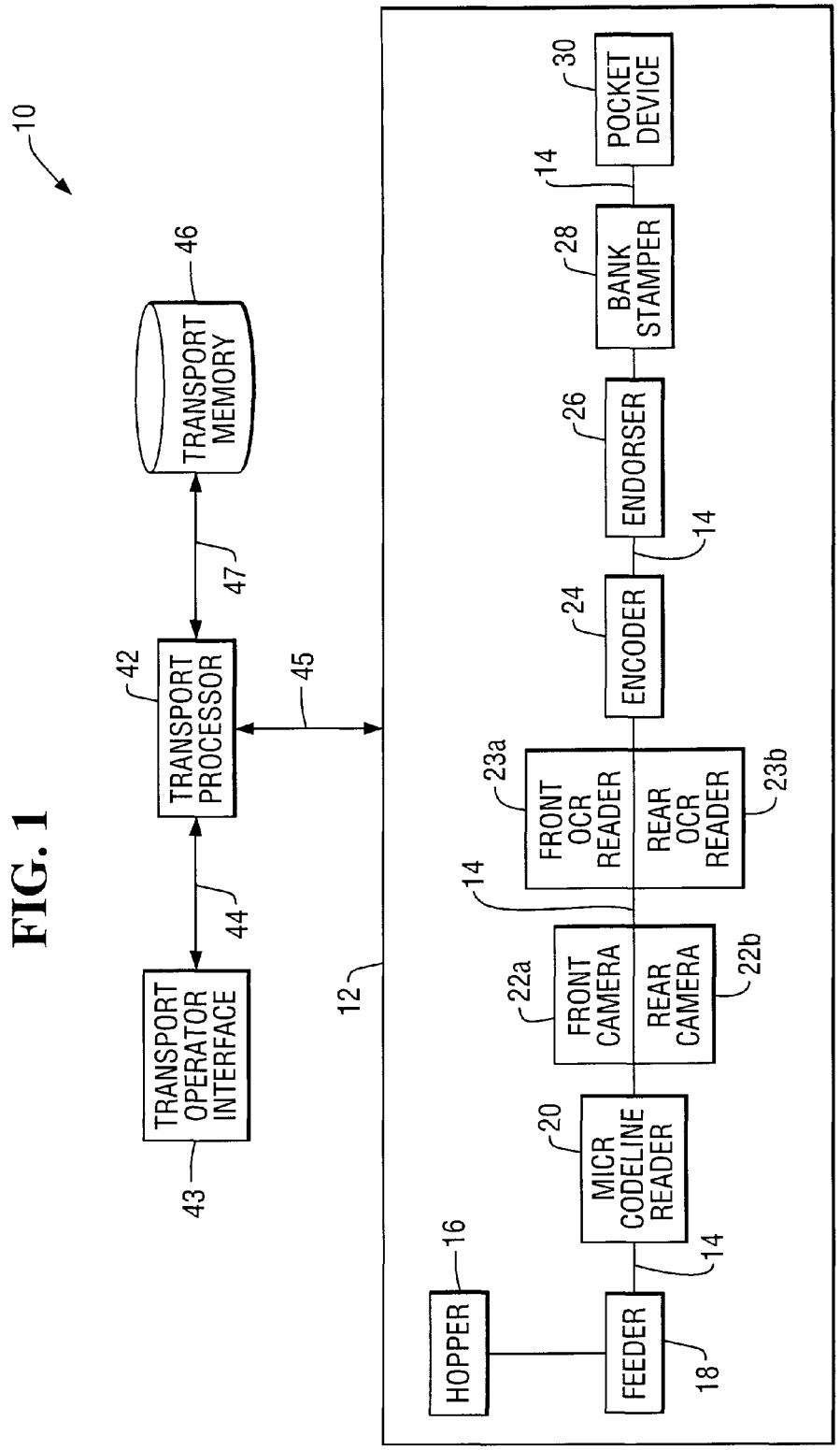
FIG. 1 is a schematic block representation of an image-based check processing system in accordance with one embodiment.

An example image-based check processing system is shown in FIG. 1, and designated with reference numeral 10. The check processing system 10 includes a check processing transport 12 having a document track 14 along which financial document items, such as checks, can be transported from an upstream end to a downstream end. The transport 12 includes a number of different check processing modules positioned along the document track 14. Each check processing module includes a number of devices associated with the particular check processing module for performing specific document processing operations on document items moving along the document track. The transport 12 includes a hopper 16 into which a stack of financial document items including checks are placed. A document feeder 18 adjacent the hopper 16 selectively feeds or drives each document item from the stack of document items in the hopper to transport the document item from the upstream end to the downstream end along the document track 14.

The check processing system 10 also includes a magnetic ink character recognition (MICR) codeline reader 20 located along the document track 14. The MICR reader 20 reads a MICR codeline from the front of each physical check being transported and processed along the document track 14. The check processing system 10 includes electronic front and rear image capture devices 22a, 22b located along the document track 14. The front image capture device 22a captures an electronic image of the front of each document item. Similarly, the rear image capture device 22b captures an electronic image of the rear of each document item. More specifically, the front image capture device 22a may include a front imaging camera, and the rear image capture device 22b includes a rear imaging camera. Structure and operation of MICR codeline readers and electronic imaging cameras are well known and, therefore, will not be described.

The check processing system 10 further includes front and rear optical character recognition (OCR) reader devices 23a, 23b located along the document track 14. The front OCR reader 23a performs an OCR read of the front image captured by the front imaging camera 22a. Similarly, the rear OCR reader 23b performs an OCR read of the rear image captured by the rear imaging camera 22b. Structure and operation of OCR readers devices are well known and, therefore, will not be described.

Although the above description describes the OCR readers 23a, 23b in hardware form, it is conceivable that the OCR readers be in software form, or a combination of both hardware and software. In the case of software OCR, the controlling software for OCR functionality may reside on the transport processor 42 shown in FIG. 1. The controlling software for software OCR may reside on a different processor, or on a server, or on a combination of different processors and servers. For convenience, OCR readers in software form will be used in the description hereinbelow.

The check processing system 10 may optionally include an encoder 24, an endorser 26, or a bank stamper 28, as shown in FIG. 1. The encoder 24 encodes missing fields on each check. The endorser 26 applies an endorsement in a known manner to each check. The bank stamper 28 stamps each check to identify the bank institution processing the check. Structure and operation of encoders, endorsers, and bank stampers are well known and, therefore, will not be described.

The check processing system 10 also includes a pocket device 30 located at the downstream end of the document track 14. The pocket device 30 has a number of different types of pockets into which processed document items are pocketed. Example types of pockets include on-us pockets, transit pockets, and reject pockets. Structure and operation of pockets in the pocket device 30 are well known and, therefore, will not be described.

The check processing system 10 further includes a transport processor 42 and a transport operator interface 43 which communicates via signals on line 44 with the transport processor. The operator interface 43 may include a keyboard, a mouse, and a display, all of which communicate via signals with the transport processor 42. The transport processor 42 controls operation of the transport 12 via signals on line 45. The check processing system 10 also includes a transport memory 46 which communicates via signals on line 47 with the transport processor 42. The memory 46 may comprise a single memory unit or a plurality of different memory units. An executable transport application program is stored in the memory 46. The transport application program is associated with a particular type of document processing work. For example, one type of work is proof of deposit. Another type of work is remittance processing. Still another type of work may be encoding and sorting of document items. Suitable processors and memories are readily available in the marketplace. Their structure and operation are well known and, therefore, will not be described.

When the transport application program is executed, the devices contained within check processing modules lying along the document track 14 are controlled to process document items moving downstream along the document track in accordance with the transport application program, as is known. The memory 46 may store sequence numbers, MICR codelines, and image data associated with document items which have been processed in accordance with the transport application program. If applicable, the memory 46 may also store encoder status, endorsement status, or bank stamp status.

Figure 2:
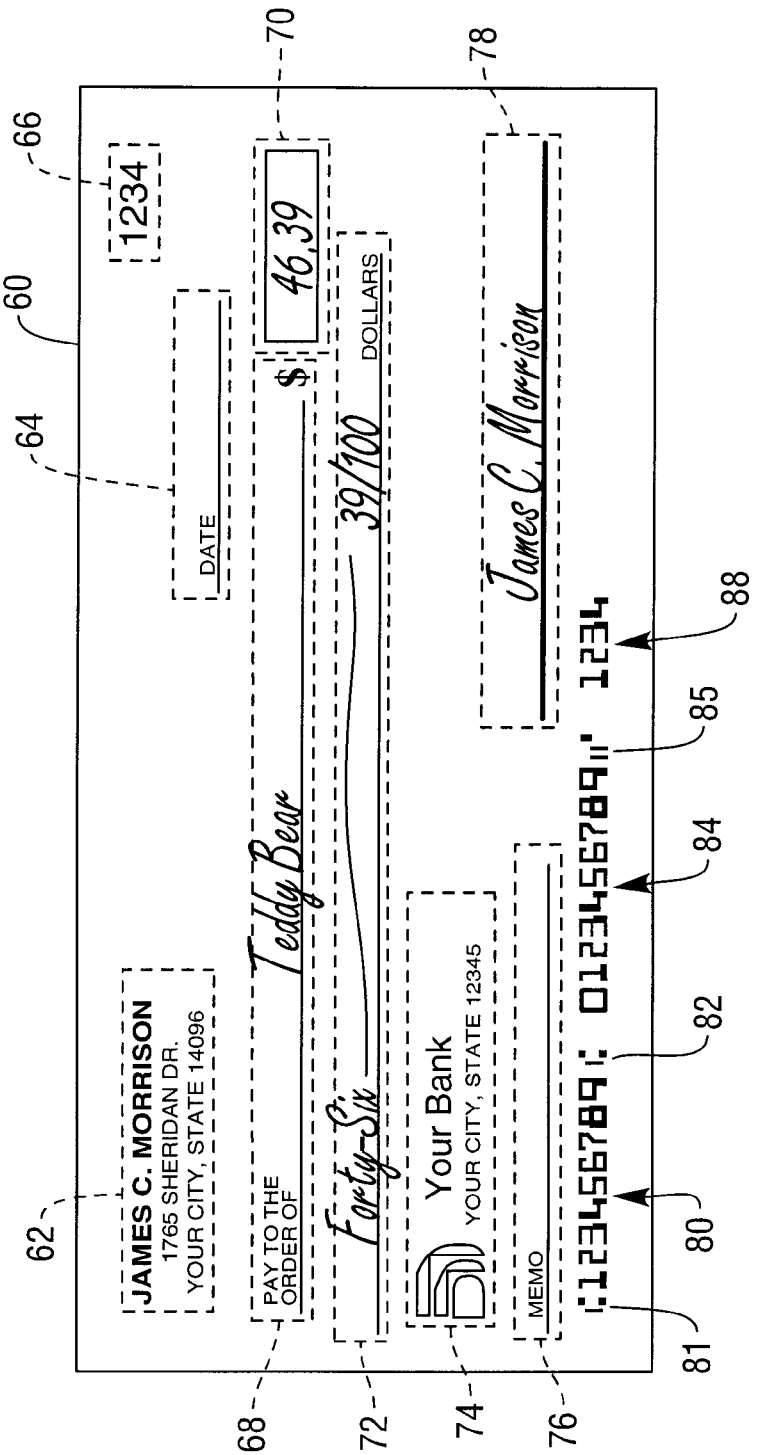
FIG. 2 is a representation of an image of a personal check which has been processed by the system of FIG. 1.

Referring to FIG. 2, a typical check 60 of the personal type is illustrated. The check 60 is made of sheet material and includes a payer field 62, a date field 64, a check number field 66 located in the upper-right corner of the check, and a payee field 68. The check 60 also includes a courtesy amount field 70, a legal amount field 72, a paying bank name field 74, a memo field 76, and a payer signature field 78. Each field of the check 60 contains pre-printed information therein, such as shown in FIG. 2.

The check 60 has a MICR codeline which comprises a routing/transit number 80, an account number 84, and a check number 88. The routing/transit number 80 is located between a first transit Q symbol 81 and a second transit Q symbol 82. The account number 84 is located between the second transit Q symbol 82 and an account Q symbol 85, as shown in FIG. 2. The check number 88 is located between the account Q symbol and an amount Q symbol (not shown in FIG. 2). The encoder 24 (FIG. 1) encodes amount Q symbols on the check 60 during processing the check. Other arrangements of routing/transit numbers, account numbers, check numbers, and Q symbols are possible. Format of Q symbols 81, 82, 85 are conventional and well known in the financial industry.

Figure 3A:
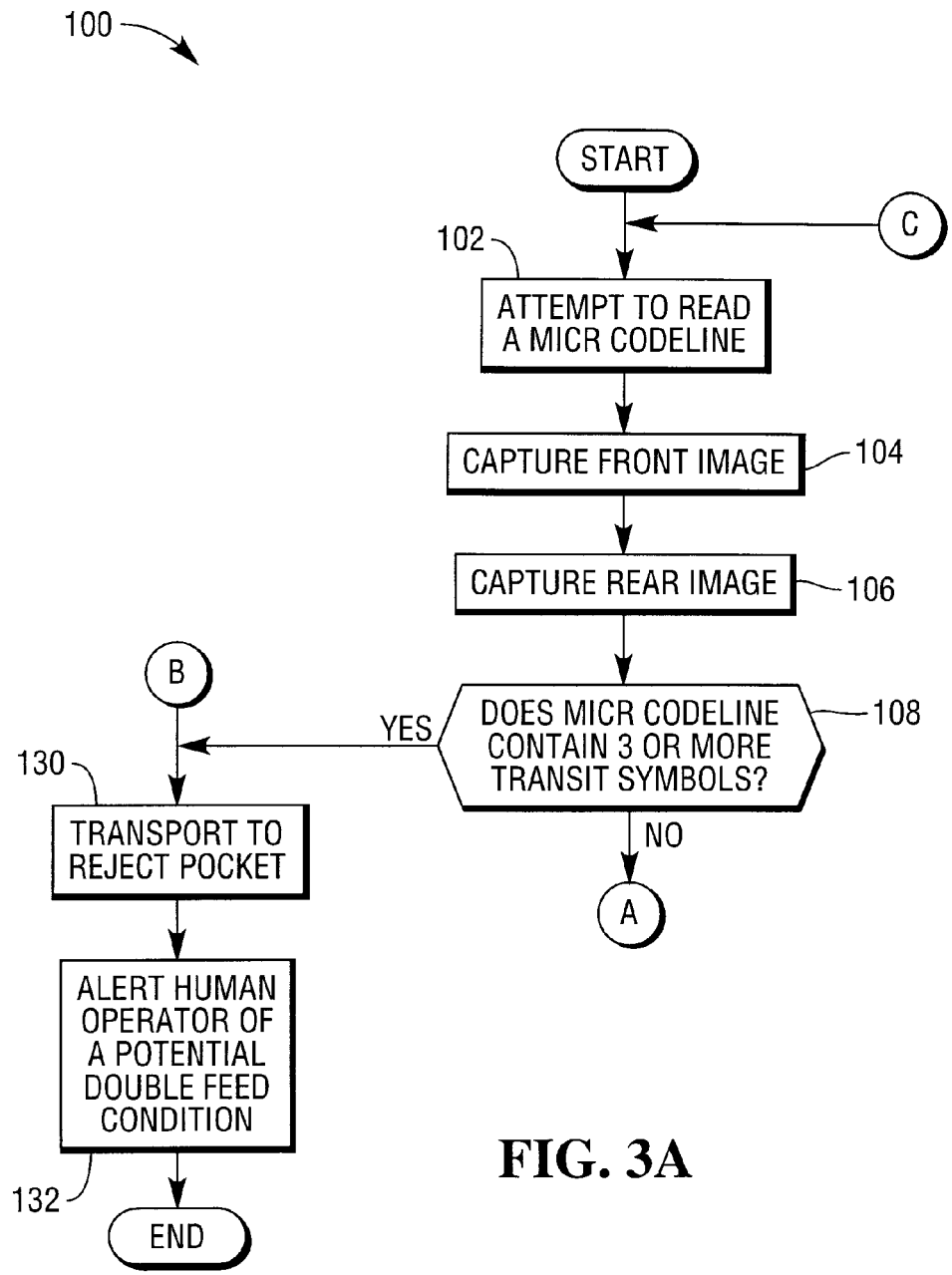
FIG. 3 depicts a flow diagram of one embodiment of a method which may be implemented by the system of FIG. 1.
Figure 3B:
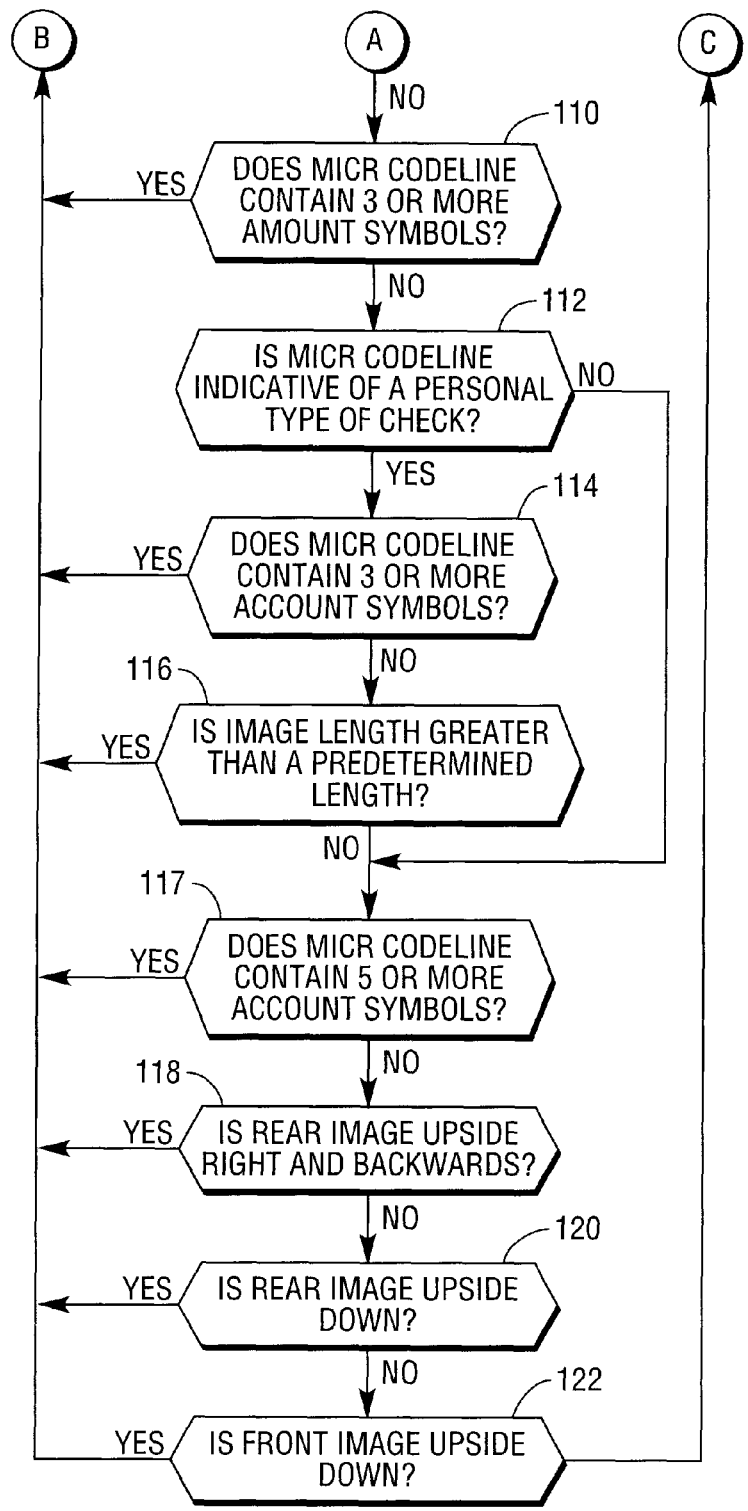

Referring to FIG. 3, a flowchart 100 depicts a method of operation of the image-based check processing system 10 of FIG. 1 in accordance with one embodiment. The MICR codeline reader 20 makes an attempt to read a MICR codeline from a physical check item as the check item is transported past the MICR reader (step 102). Then, as the check item is transported along the document track 14 past the front and rear imaging cameras 22a, 22b, the front of the check item and the back of the check item are imaged (steps 104 and 106).

A determination is made (step 108) as to whether the read of a MICR codeline from the check item in step 102 contains three or more transit Q symbols (such as transit Q symbols 81, 82 shown in FIG. 2). If the determination in step 108 is affirmative (i.e., the MICR codeline read from the check item contains at least three transit Q symbols), then the process proceeds to step 130 in which the check item is transported to a reject pocket of the pocket device 30. A human operator is alerted of a potential double feed condition (step 132). Other ways of alerting an operator are possible. As an example, a pop-up message may be presented on a display to alert an operator that a check item is being flagged and directed to a particular pocket. As another example, the check item may be halted in the document track 14, and a pop-up message presented to an operator. Although both steps 130 and 132 are performed as described hereinabove, it is conceivable that only one of steps 130 and 132 be performed.

However, if the determination in step 108 is negative (i.e., the MICR codeline read from the check item does not contain at least three transit Q symbols), then the process proceeds to step 110. In step 110, a determination is made as to whether the read of a MICR codeline from the check item in step 102 contains three or more amount Q symbols. If the determination in step 110 is affirmative (i.e., the MICR codeline read from the check item contains at least three amount Q symbols), then the process proceeds to step 130 in which the check item is transported to a reject pocket of the pocket device 30. A human operator is alerted of a potential double feed condition (step 132). However, if the determination in step 110 is negative (i.e., the MICR codeline read from the check item does not contain at least three amount Q symbols), then the process proceeds to step 112.

In step 112, a determination is made as to whether the read of a MICR codeline from the check in step 102 is indicative of the check item being a personal type of check. If the determination in step 112 is negative (i.e., the check item being processed is not a personal type of check), then the process proceeds directly to step 117. However, if the determination in step 112 is affirmative (i.e., the check item is a personal type of check), then the process proceeds to step 114. In step 114, a determination is made as to whether the read of a MICR codeline from the check item in step 102 contains three or more account Q symbols (such as amount Q symbol 85 shown in FIG. 2).

If the determination in step 114 is affirmative (i.e., the MICR codeline read from the check item contains at least three account Q symbols), then the process proceeds to step 130 in which the check item is transported to a reject pocket of the pocket device 30. A human operator is alerted of a potential double feed condition (step 132). It should be noted that personal checks can have up to two account Q symbols. Accordingly, the operator is notified if the MICR codeline contains three or more account Q symbols. However, if the determination in step 114 is negative (i.e., the MICR codeline read from the check item does not contain at least three account Q symbols), then the process proceeds to step 116.

In step 116, a determination is made by software OCR on the front check image captured in step 104 as to whether image length is greater than a predetermined length which corresponds to the maximum length for a personal type of check. The data representative of the predetermined length is stored in a memory which may be the transport memory 46 shown in FIG. 1. If the determination in step 116 is affirmative (i.e., the image length exceeds the maximum length for a personal type of check), then the process proceeds to step 130 in which the check item is transported to a reject pocket of the pocket device 30. A human operator is alerted of a potential double feed condition (step 132). However, if the determination in step 116 is negative (i.e., the image length does not exceed the maximum length for a personal type of check), then the process proceeds to step 117.

If the determination in step 117 is affirmative (i.e., the MICR codeline read from the check item contains at least five account Q symbols), then the process proceeds to step 130 in which the check item is transported to a reject pocket of the pocket device 30. A human operator is alerted of a potential double feed condition (step 132). It should be noted that business checks (i.e., non-personal checks) can have up to four account Q symbols. Accordingly, the operator is notified if the MICR codeline contains five or more account Q symbols. However, if the determination in step 117 is negative (i.e., the MICR codeline read from the check item does not contain at least five account Q symbols), then the process proceeds to step 118.

In step 118, a determination is made by software OCR on the rear check image captured in step 106 as to whether the rear check image indicates that the check item in the document track 14 is upside right and backwards. If the determination in step 118 is affirmative (i.e., the rear image of the check item in the document track 14 is upside right and backwards), then the process proceeds to step 130 in which the check item is transported to a reject pocket of the pocket device 30. A human operator is alerted of a potential double feed condition (step 132). However, if the determination in step 118 is negative (i.e., the rear image of the check item in the document track 14 is not upside right and backwards), then the process proceeds to step 120.

In step 120, a determination is made by software OCR as to whether the rear check image captured in step 106 indicates that the check item in the document track 14 is upside down (i.e., is not upside right). If the determination in step 120 is affirmative (i.e., the rear image of the check item in the document track 14 is upside down), then the process proceeds to step 130 in which the check item is transported to a reject pocket of the pocket device 30. A human operator is alerted of a potential double feed condition (step 132). However, if the determination in step 120 is negative (i.e., the rear image of the check item in the document track 14 is not upside down), then the process proceeds to step 122.

In step 122, a determination is made by software OCR as to whether the front check image captured in step 104 indicates that the check item in the document track 14 is upside down (i.e., is not upside right). If the determination in step 122 is affirmative (i.e., the front image of the check item in the document track 14 is upside down), then the process proceeds to step 130 in which the check item is transported to a reject pocket of the pocket device 30. A human operator is alerted of a potential double feed condition (step 132). However, if the determination in step 122 is negative (i.e., the front image of the check item in the document track 14 is not upside down), then the process proceeds back to step 102 to begin processing the next document item.

It should be apparent that the above description describes a combination of a number of factors in determining whether a check item being processed along the document track 14 is a double feed. One factor is whether MICR codeline information is readable from the check item which is moving along the document track 14. Another factor is whether the number of different Q symbols contained in a front image of the check item meet predetermined criteria. Still another factor is whether the check item is a personal type of check and length of the check item is within a predetermined length. Other factors include whether the front image of the check item or the rear image of the check item, or both, meet predetermined criteria (e.g., upside right or upside down).

It should be apparent that the example method described hereinabove is performed by a computer having a memory executing one or more programs of instructions which are tangibly embodied in a program storage medium readable by the computer. A single computer associated with the image-based check processing system 10 may perform the example methods described hereinabove. However, it is conceivable that more than one computer associated with the image-based check processing system 10 perform the example method described hereinabove.

It should further be apparent that the example method described hereinabove provides an improved double feed detecting feature. This feature may be implemented by a double feed detecting algorithm which is expressed in a computer program containing executable instructions which, when executed, carry out steps of the algorithm to provide the feature. By providing an improved double feed detecting feature, involvement of human-operator time to reprocess a missed check is reduced. This results in cost savings during operation of the image-based check processing system 10.

Also, although the above description describes double feed detection being performed in real time, it is conceivable that double feed detection be performed in batch. As an example in the case of batch processing, controlling software for software OCR would process the MICR codeline and the front and rear images of a check item and mark suspect double feed items. It is conceivable that the controlling software for OCR performs operations to make the decision to either accept or reject the check item and direct the check item to the appropriate pocket in the pocket device 30. A human operator would then verify check images and also possibly verify physical check items to ensure that there are no extra document items in pockets of the pocket device 30.

Although the above description describes double detection without any hardware double feed detect sensors, it is conceivable that any number of such hardware sensors may be used in combination with the double feed detection process described hereinabove.

Also, although the above description describes double feed detection being performed in an image capture transport of a check processing system during a first pass of check processing as described hereinabove, it is conceivable that double feed detection may be performed in an encoding and sorting transport of the check processing system during a second pass of check processing.

While the present invention has been illustrated by the description of example processes and system components, and while the various processes and components have been described in detail, applicant does not intend to restrict or in any limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method of operating an image-based check processing system to detect a double feed condition of checks, the method comprising:
    reading a magnetic ink character recognition (MICR) codeline from front of a check item;
    capturing image data which is representative of an image of the check item as the check item is transported from an upstream end of the document feed path to a downstream end of the document feed path;
    electronically by a processor, processing the captured image data to determine if the image of the check item is upside down;
    concluding that the check item is a double-fed item when a MICR codeline is readable from the front of the check item and a determination is made that the image of the check item is upside down; and
    alerting an operator to indicate a double-fed item when a conclusion is made that the check item is a double-fed item.

2. A method according to claim 1, wherein capturing image data includes capturing image data which is representative of a rear image of the check item as the check item is transported from the one end of the document transport path to the other end of the document feed path.

3. A method according to claim 1,
    wherein capturing image data includes capturing image data which is representative of a front image of the check item as the check item is transported from the one end of the document feed path to the other end of the document feed path.

4. A method according to claim 1, further comprising:
    electronically by a processor, processing the captured image data to determine if the image of the check item is upside right and backwards; and
    concluding that the check item is a double-fed item when a MICR codeline is readable from front of the check item and a determination is made that the image of the check item is upside right and backwards.

5. A method according to claim 1, wherein the method is performed by a computer having a memory executing one or more programs of instructions which are tangibly embodied in a program storage medium readable by the computer.

6. A method of operating an image-based check processing system to detect a double feed condition of checks, the method comprising:
    reading a magnetic ink character recognition (MICR) codeline from front of a check item;
    electronically by a processor, determining a number of check symbols associated with the check item based upon information from the MICR codeline read from the front of the check item;
    concluding that the check item is a double-fed item when a determination is made that at least three check symbols are associated with the check item; and
    alerting an operator to indicate a double-fed item when a conclusion is made that the check item is a double-fed item.

7. A method according to claim 6, wherein the check symbol comprises transit Q symbols associated with a check.

8. A method according to claim 6, wherein the check symbol comprises amount Q symbols associated with a check.

9. A method according to claim 6, wherein the check symbol comprises account symbols associated with a check.

10. A method according to claim 6, wherein the method is performed by a computer having a memory executing one or more programs of instructions which are tangibly embodied in a program storage medium readable by the computer.

11. A check processing apparatus comprising:
    a document feed mechanism having a document feed path;
    a magnetic ink character recognition (MICR) codeline reader arranged to read a MICR codeline from front of a check item as the check item is transported along the document feed path from an upstream end of the document feed path to a downstream end of the document feed path;

a first imaging camera arranged to capture image data which is representative of a front image of a check item as the check item is transported along the document feed path;

a second imaging camera arranged to capture image data which is representative of a rear image of a check item as the check item is transported along the document feed path;

a first optical character recognition (OCR) reader arranged to perform an OCR read of a captured front image of a check item as the check item is transported along the document feed path;

a second OCR reader arranged to perform an OCR read of a captured rear image of a check item as the check item is transported along the document feed path;

a number of pockets located at the downstream end of the document feed path; and a processor programmed to (i) process data from a MICR codeline read from front of a check item by the MICR reader, (ii) process data from an OCR read of a captured rear image of the check item by the second OCR reader, (iii) control the document feed mechanism to transport the check item to a particular pocket when processed data is indicative of the check item comprising two overlapping checks, (iv) process data from a MICR codeline read from front of the check item by the MICR reader to determine if the check item in the document feed path is a personal type of check, (v) process data from an OCR read of a captured front image of the check item by the first imaging camera to determine if image length is greater than a predetermined length, and (vi) control the document feed mechanism to transport the check item to a particular pocket when the check item is determined to be a personal type check and the image length is determined to be greater than the predetermined length.

12. A check processing apparatus according to claim 11, wherein the processor is further programmed to (vii) process data from an OCR read of a captured front image of the check item by the first imaging camera to determine a number of check symbols associated with the captured front image of the check item, and (viii) control the document feed mechanism to transport the check item to a particular pocket when the number of check symbols associated with the front image of the check item is at least a predetermined number.

* * * * *